United States Patent [19]

Maruyama et al.

[11] Patent Number: 5,547,501

[45] Date of Patent: Aug. 20, 1996

[54] METHOD FOR FORMATION OF INVISIBLE MARKING AND METHOD FOR READING OF INVISIBLE MARKING

[75] Inventors: Tsutomu Maruyama, Hiratsuka; Atsushi Akiyama, Chigasaki; Kazuo Sanada; Sadao Chigira, both of Chiba; Masanobu Hidaka, Kiyose, all of Japan

[73] Assignees: Kansai Paint Co., Ltd., Hyogo; Fujikura Ltd., Tokyo; Matsuo Sangyo Co., Ltd., Osaka-fu, all of Japan

[21] Appl. No.: 435,615

[22] Filed: May 5, 1995

[30] Foreign Application Priority Data

May 6, 1994 [JP] Japan .................................. 6-116039
May 6, 1994 [JP] Japan .................................. 6-116040

[51] Int. Cl.⁶ .................................................. C09D 11/02
[52] U.S. Cl. ..................... 106/21 R; 106/21 A; 106/21 E
[58] Field of Search ............................. 106/21 R, 21 A, 106/21 E

[56] References Cited

U.S. PATENT DOCUMENTS

| | | | |
|---|---|---|---|
| 4,029,506 | 6/1977 | Dessauer | 106/21 A |
| 5,286,286 | 2/1994 | Winnik et al. | 106/21 A |
| 5,460,646 | 10/1995 | Lazzouni et al. | 106/21 A |
| 5,478,381 | 12/1995 | Ohiwa et al. | 106/21 A |

OTHER PUBLICATIONS

"IR–RAY Absorbing Printing Ink For Invisible Bar Code Printings", Database WPI, Week 9420, Apr. 19, 1994, Derwent Publications Ltd., London, Great Britain, AN 164182, and JP-A-6 107 985.

*Primary Examiner*—Helene Klemanski
*Attorney, Agent, or Firm*—Wenderoth, Lind & Ponack

[57] ABSTRACT

Information is printed on the surface of a substrate with a marking ink containing a mixture of an indium-tin mixed oxide and at least one compound selected from the group consisting of alumina, barium sulfate, silicon dioxide and calcium carbonate, to prepare an invisible marking-printed material; and infrared rays of 2–10 μm wavelength are applied onto the invisible marking-printed material to measure the infrared absorptivities of the invisible marking area and other area of said material and identify the information signified by the invisible marking.

18 Claims, 1 Drawing Sheet

CONSTITUTION OF BAR CODE READER

CONSTITUTION OF MARKING READER

METHOD FOR FORMATION OF INVISIBLE MARKING AND METHOD FOR READING OF INVISIBLE MARKING

The present invention relates to a method for formation of invisible marking, which comprises printing information (e.g. bar code, mark and lot number) on a substrate with a particular ink (a marking agent), as well as to a method for reading of invisible marking, which comprises applying infrared rays of 2–10 µm wavelength onto an invisible marking-printed material obtained by the above method for formation of invisible marking, to measure the infrared absorptivities of the invisible marking-printed area and other area of said material to ideintify the information signified by the invisible marking.

Bar code is an information medium for merchandise management, consisting of white bar(s) and black bar(s), and is in wide use to manage the kinds, prices, sales volumes and amounts, stock levels, etc. of merchandises by reading the bar code using an optical device. Bar code is expected to find even wider applications in the future. Bar code has hitherto been printed in two colors (i.e. white and black) so as to be seen with naked eyes, which is undesirable from the standpoint of merchandise designing and makes impossible the bar code application to merchandise portions which are liable to be stained. Incidentally, bar code itself has no meaning to general consumers and is used solely for merchandise management.

Hence, there was proposed a special bar code ( a so-called stealth bar code) which is invisible to naked eyes and whose information can be identified by the application of infrared rays. In this bar code, a coating agent containing an indium-tin mixed oxide as an only infrared-absorbing compound is printed on a substrate in a bar code pattern. The printed bar code, however, has a color (a yellowish green color) and is distinctly visible to naked eyes; therefore, the above-mentioned problems are not fully solved. Moreover, in the case of using an indium-tin mixed oxide as an only infrared-absorbing compound, the identifiability of information is low when the substrate has a high reflectance, and the device for identification inevitably has a complex structure.

An object of the present invention is to solve the above-mentioned problems and provide a method for formation of invisible marking, which method comprises printing information on a substrate so that the printed information is substantially or completely unseen to naked eyes but can easily be identified by the application of infrared rays even when the substrate has a high reflectance.

Another object of the present invention is to provide a method for easily identifying the invisible marking formed by the above method for formation of invisible marking.

The other objects and features of the present invention will become apparent from the following description.

According to the present invention there is provided a method for formation of invisible marking, which comprises printing information on the surface of a substrate with a marking ink containing a mixture of an indium-tin mixed oxide and at least one compound selected from the group consisting of alumina, barium sulfate, silicon dioxide and calcium carbonate.

According to the present invention there is further provided a method for reading of invisible marking, which comprises applying infrared rays of 2–10 µm wavelength onto an invisible marking-printed material (obtained by printing information on the surface of a substrate with a marking ink containing a mixture of an indium-tin mixed oxide and at least one compound selected from the group consisting of alumina, barium sulfate, silicon dioxide and calcium carbonate) to measure the infrared absorptivities of the invisible marking area and other area of said material and identify the information signified by the invisible marking.

The methods of the present invention are hereinafter described in more detail.

The marking ink used in the present invention is a marking agent used for printing information (e.g. bar code, mark and lot number) on the surface of a substrate. The marking ink, when coated on the substrate surface and irradiated with infrared rays of particular wavelength, gives a infrared reflectance or absorptivity different from that given by the non-coated surface area, whereby the information printed on the surface can be identified and used for merchandise management.

The marking ink contains, as the main components, a mixture of an indium-tin mixed oxide (hereinafter referred to as "ITO") and at least one compound selected from the group consisting of alumina, barium sulfate, silicon dioxide and calcium carbonate, and a coating resin. The marking ink further contains, as necessary, a solvent or dispersing agent (e.g. an organic solvent or water), a extender pigment, etc.

ITO, which is a mixture of indium oxide ($In_2O_3$) and tin oxide, has a feature of giving a substantially fixed reflectance when irradiated with infrared rays of 2–10 µm. Preferably, ITO is ground beforehand so as to have an average particle diameter of 0.001–0.5 µm, preferably 0.01–0.1 µm.

The mixing ratio of indium oxide and tin oxide in ITO has no particular restriction. However, it is generally preferable that the proportion of indium oxide is 5–95%, particularly 40–90%, more particularly 50–85% and the proportion of tin oxide is 95–5%, particularly 60–10%, more particularly 50–15%, all based on the total weight of the two components.

In the marking ink used in the present invention, ITO is used as a mixture with at least one compound selected from alumina ($Al_2O_3$), barium sulfate ($BaSO_4$), silicon dioxide ($SiO_2$) and calcium carbonate ($CaCO_3$). The reason is that when ITO is used alone, the printed marking is easily visible to naked eyes and the object of the present invention cannot be achieved. The proportions of the two components in the mixture has no strict restriction; however, the preferable amount of the at least one compound selected from alumina, barium sulfate, silicon dioxide and calcium carbonate is generally 5–400 parts by weight, particularly 7–200 parts by weight, more particularly 10–80 parts by weight per 100 parts by weight of ITO. These alumina, barium sulfate, silicon dioxide and calcium carbonate can be used with ITO in the form of a fine powder having an average particle diameter of generally 0.01–2 µm, preferably 0.1–0.5 µm.

In the present specification, the mixture of ITO and at least one compound selected from alumina, barium sulfate, silicon dioxide and calcium carbonate is hereinafter referred generically to as "ITO mixture".

The coating resin is a vehicle and basic component required to uniformly disperse the ITO mixture in the marking ink and satisfactorily form a film of the marking ink, and has no particular restriction as to the composition. It may be a resin ordinarily used in inks and coatings. Specific examples thereof are a polyester resin, an alkyd resin, an epoxy resin, a vinyl resin, a fluororesin, a urethane resin, a polyamide resin, a polyimide resin, a polysiloxane and an acrylic resin. They may each be any of thermoplastic type, room temperature crosslinking type, and thermosetting type. In order to crosslink and cure the coating resin, it is possible to use as necessary, in combination with the resin, a crosslinking agent such as melamine resin, urea resin, polyisocyanate compound, polycarboxylic acid or anhydride thereof, epoxy compound or the like.

The content of the ITO mixture in the marking ink is not particularly restricted, but is generally 50–1,000 parts by weight, particularly 70–800 parts by weight, more particularly 100–300 parts by weight per 100 parts by weight (as solid) of the coating resin. The marking ink contains the ITO mixture and the coating resin as the essential components, and these components are preferably dissolved or dispersed in an organic solvent and/or water for better marking operation. The organic solvent may be any organic solvent as long as it can dissolve or disperse the ITO mixture and the coating resin, and includes, for example, at least one compound selected from aliphatic or aromatic hydrocarbons, alcohols, esters, ketones, etc. The aqueous medium may be deionized water, tap water or the like.

In the present invention, the substrate to which the marking ink is to be applied, is not particularly restricted. The substrate may be made of a metal, a plastic, a paper, a woody material, a glass, a ceramic, an inorganic material or the like, and may have any desired shape such as cylinder, box, bag, sheet, plate, sphere, foam or the like. The substrate may be subjected to a surface treatment such as chemical treatment or the like before it is coated with the marking ink. The surface of the substrate to be coated preferably has a reflectance of at least 20%, particularly at least 30% when irradiated with infrared rays of 2–10 µm wavelength.

The marking (printing) on the substrate surface can be conducted, for example, by gravure printing, silk screen printing, offset printing, ink jet printing or the like. The preferable thickness of the marking film formed is 0.5–10 µm, particularly 1–5 µm in terms of dry film thickness. The marking film can be cured by room temperature standing, heating or irradiation with infrared rays or electron beam, depending upon the kind of the vehicle component used.

The form of marking is not particularly restricted and includes, for example, letters, numerals, symbols and patterns. It specifically is bar codes, production dates, lot numbers, marks, etc.

On at least the marking area and its vicinity of the substrate surface after marking may further be coated a clear coating as necessary. This is preferable because the marking can be protected thereby.

The clear coating is a coating capable of forming a clear film. It contains no coloring pigment, and contains a coating resin as the main component and, as necessary, a solvent or dispersing agent (e.g. an organic solvent or water), etc. The coating resin may be the same coating resin as mentioned with respect to the ITO mixture, and it may be used in combination with the same crosslinking agent as mentioned with respect to the ITO mixture.

The coating of the clear coating can be conducted, for example, by gravure printing, silk screen printing, offset printing, ink jet printing or the like. The preferable thickness of the clear coating film formed is generally 1–20 µm, particularly 3–10 µm in terms of dry (cured) film thickness. The clear coating film can be cured by room temperature standing, heating or irradiation with infrared rays or electron beam, depending upon the kind of the vehicle component used.

On at least the marking area and its vicinity of the substrate surface after marking may also be coated a coloring ink as necessary. This coating can hide the marking area of the substrate and moreover can give any desired color tone, providing an improved appearance. It was surprisingly found out in the present invention that hiding of the marking area with the coloring ink gives substantially no adverse effect on the identifiability of information by the irradiation of infrared rays of 2–10 µm wavelength.

The reason why the information of the marking area can be read even when the marking area is hidden by the coloring ink, is that between the marking area and other area both beneath the coloring ink film there is difference in reflectance for infrared rays of 2–10 µm wavelength (generally, the other area gives a higher reflectance for said infrared rays than the marking area).

The coloring pigment used in the coloring ink preferably has an absorptivity for infrared rays of 2–10 µm wavelength, different from that of ITO because the reading of information (marking) is conducted by the use of a difference in infrared absorbance between the marking area and other area both covered by the coloring ink layer.

When there is formed the coloring ink layer, the marking area beneath the coloring ink layer may have a color. In this case, therefore, the marking ink need not contain alumina, barium sulfate, silicon and/or calcium carbonate.

The coloring ink contains a coloring pigment, a coating resin and, as necessary, a solvent or dispersing agent (e.g. an organic solvent or water), etc. The coloring pigment can freely be selected from white pigments (e.g. titanium dioxide and zinc oxide) and other coloring pigments. The coating resin may be the same coating resin as mentioned with respect to the ITO mixture, and it may be used in combination with the same crosslinking agent as mentioned with respect to the ITO mixture. The proportion of the coloring pigment has no particular restriction as long as it can sufficiently 340 hide the marking area, but the appropriate proportion is generally 1–300 parts by weight, particularly 10–200 parts by weight per 100 parts by weight (as solid) of the coating resin.

The coating of the coloring ink can be conducted, for example, by gravure printing, silk screen printing, offset printing, ink jet printing or the like. The preferable thickness of the coloring ink film formed is generally 0.5–20 µm, particularly 1–5 µm in terms of dry (cured) film thickness. The coloring ink film can be cured by room temperature standing, heating or irradiation with infrared rays or electron beam, depending upon the kind of the vehicle component used.

The invisible marking thus formed on a substrate has a feature of giving, when irradiated with infrared rays of 2–10 µm wavelength, a substantially fixed reflectance depending upon the intensity of the energy of the infrared rays applied.

Accordingly, the reading of the information printed on a substrate according to the present invention can be conducted by irradiating the information-printed substrate with infrared rays of 2–10 µm wavelength and measuring the infrared absorptivities of the marking (information) area and other area.

The source for infrared rays used for the reading has no particular restriction as long as it can emit infrared rays of 2–10 µm wavelength. There can be used, for example, a tungsten lamp, a halogen lamp or the like.

The detection of the infrared rays reflected from the substrate surface can be conducted by the use of, for example, an infrared detector or an infrared camera. The detection can measure the amounts of the reflected lights from the marking area and other area and, based on the difference of the two light amounts, the information printed on the substrate can be identified and read.

The method for reading of invisible marking according to the present invention is specifically described with reference to FIG. 1 and FIG. 2.

Figure 1:
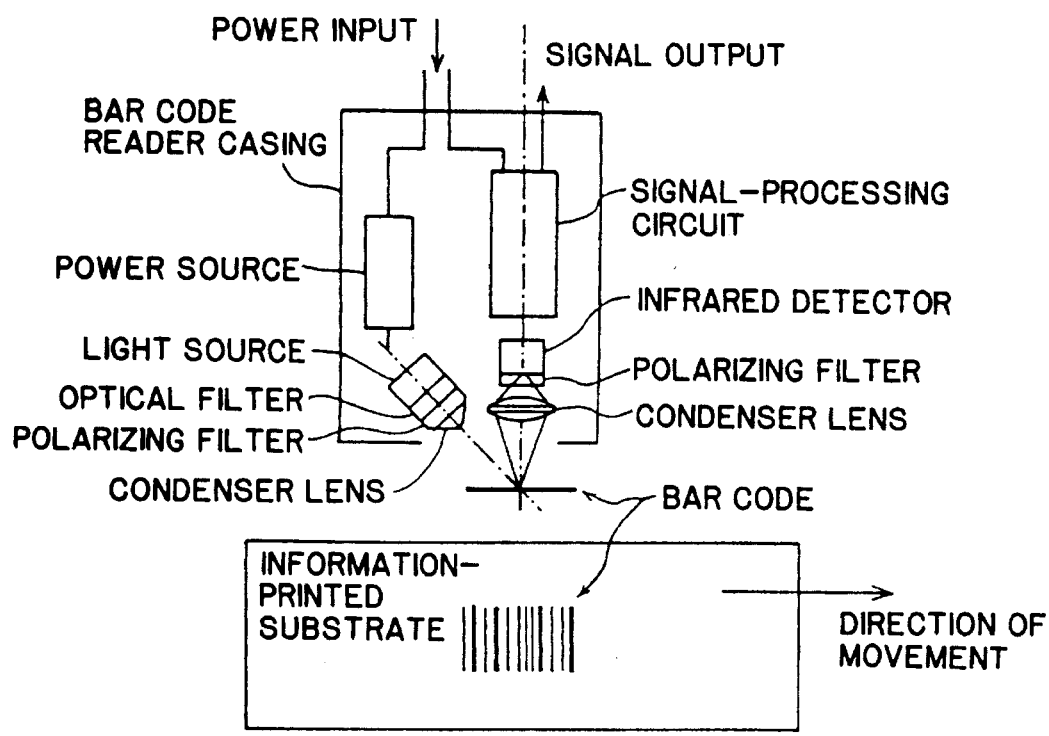
FIG. 1 is a schematic drawing of an apparatus for reading of the bar code formed on a substrate according to the method of the present invention.

FIG. 1 shows the constitution of a bar code reader used for reading the bar code printed on a substrate according to the method of the present invention. With this reader, first the bar code-printed substrate is irradiated with infrared rays. A tungsten lamp, for example, can be used as the light source for infrared rays. The light from the light source is passed through an optical filter capable of transmitting a light of 2–10 μm wavelength, for example, a Ge single crystal filter of 5 mm in thickness to selectively obtain a light of desired wavelength range. This light of particular wavelength range is then applied to the bar code-printed area and other area of the substrate via a condenser lens (e.g. one having a spot size of 0.1–2 mm and a resolving power of 0.1–0.5 mm).

The light reflected from the substrate is condensed by a condenser lens provided in front of an infrared detector and is sent to the infrared detector. As the infrared detector, there can be used, for example, PBS (used at room temperature) having a peak wavelength of 2.2–2.5 μm and a cutoff long wavelength of 2.9–3.1 μm, or PbSe (used at room temperature) having a peak wavelength of 3.8 μm and a cutoff long wavelength of 4.85 μm. In order to increase the S/N ratio of the signal light entering the infrared detector, a polarizing filter (e.g. a polarizer made of a metal whiskers thin film) may be provided as necessary at the exit end of the light source and at the incident end of the infrared detector, whereby the deflected light from each polarizer can consist of two straight light components intersecting each other at right angles. These polarizing filters each have an extinction ratio of 20–60 dB depending upon their properties and can weaken the light reflected from the bar code and entering the infrared detector; therefore, use of the polarizing filters enables effective detection of the difference in infrared reflectance between the bar code-printed area and other area of the substrate.

The infrared detector detects the intensity of the 2–10 μm infrared rays of the signal light fed thereinto; the intensity is processed by a signal-processing circuit to read the bar code information printed on the substrate; the read information is sent to a display unit as an output signal to display it on the unit.

Figure 2:
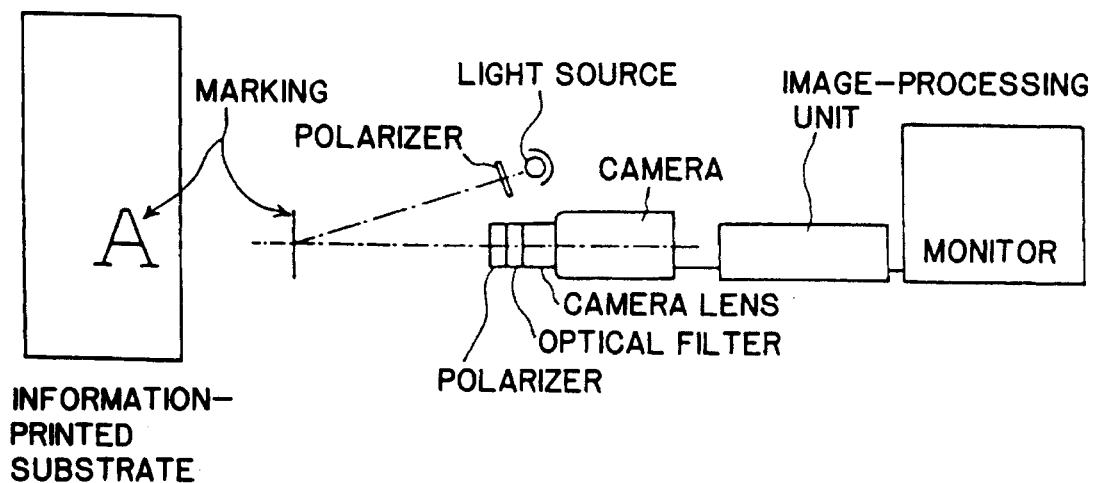
FIG. 2 is a schematic drawing of an apparatus for reading of the marking formed on a substrate according to the method of the present invention.

FIG. 2 shows the constitution of a reader used for reading the marking (e.g. letters or symbols) printed on a substrate according to the method of the present invention. With this reader, first the marking-printed substrate is irradiated with a light emitted from a light source, for example, a halogen lamp. The light reflected from the substrate is passed through an optical filter, for example, a Ge single crystal filter capable of transmitting a light of 2 μm or larger wavelength and then is projected on the imaging plane of an infrared camera sensitive to 2–10 μm wavelength. In order to increase the S/N ratio of the image inputted to the camera, similarly to the case of FIG. 1, a polarizer (e.g. one made of a metal whiskers thin film) may be provided as necessary at the exit end of the light source and at the incident end of the infrared camera so that the deflected light from each polarizer can consist of two straight light components intersecting each other at right angles.

When the image on the imaging plane has no contrast enough to enable visual identification, it is possible to modulate (intensify) the contrast by the use of an image processing unit and display on a monitor.

The present invention is hereinafter described specifically with reference to Examples. In the Examples, parts and % are by weight.

EXAMPLE 1

There were mixed 320 parts of an indium-tin mixed oxide (ITO) (a product of Fuji Titanium Industry Co., Ltd.; average particle diameter=0.03 μm), 250 parts of an alumina powder [#1000 White Alundum (trade name) produced by Showa Denko K. K.], 140 parts of a polyester resin (a solution having a solid content of 50%), 200 parts of butyl acetate and 150 parts of toluene. The mixture was dispersed by the use of a paint conditioner to obtain a marking ink (1).

The ink (1) was coated on an aluminum plate (thickness= 0.3 mm) to form a bar code pattern in a film thickness (a cured film thickness, the same applies hereinafter) of 3 μm by the use of a gravure coater, followed by drying at 100° C.

On at least the bar code pattern was coated an aqueous clear coating of acrylic resin type in a film thickness of 3 μm, followed by drying at 150° C. for 60 seconds.

The bar code-printed aluminum plate was irradiated with infrared rays of 3 μm wavelength and the reflectance was measured. As a result, the refectance of the printed area was smaller by 20 dB or more than that of other area, and the two areas could be distinguished clearly. Moreover, the adhesion between the coating film and the aluminum plate was good, and the visible light transmittance of the coating film was 80% or more and the visual distinction between the printed area and other area was impossible.

EXAMPLE 2

There were mixed 300 parts of ITO, 220 parts of barium sulfate, 300 parts of an acrylic resin emulsion (solid content=40%) and 500 parts of tap water, and the mixture was dispersed by the use of a sand mill to obtain a marking ink (2).

The ink (2) was coated on an aluminum-metallized paper (thickness=0.3 μm) to form a bar code pattern in a film thickness of 5 μm, followed by drying at 100° C. On at least the bar code-printed area was coated a clear coating consisting of an acrylonitrilebutadiene emulsion by the use of a gravure coater, followed by drying.

The ink (2)-printed area had an infrared (3 μm wavelength) reflectance of 6% while that of the non-printed area was 60%. The printed information (bar code) was read by the use of a bar code reader shown in FIG. 1, which enabled clear and exact reading. Moreover, the adhesion between the ink (2) film and the aluminum-metallized paper was good, and the ink (2) film was transparent and the visual distinction between the printed area and the non-printed area was difficult. When the printed film was observed by the use of a marking reader shown in FIG. 2, the bar code could be recognized clearly on the monitor.

EXAMPLE 3

There were mixed 600 parts of ITO, 140 parts of silicon dioxide, 400 parts of a polysiloxane resin (solid content= 40%), 200 parts of isopropyl alcohol and 500 parts of isobutyl acetate. The mixture was dispersed by the use of a sand mill to obtain a marking ink (3).

The marking ink (3) was diluted with methyl ethyl ketone and then coated on a glass plate (thickness =1 mm) to form a marking of "ABC" in a film thickness of 1 μm by ink jet printing, followed by drying at 200° C.

The thus-formed marking was read in the same manner as in EXAMPLE 2. As a result, the marking could be identified clearly, and the adhesion between the ink (3) film and the glass plate was good. Moreover, the visual distinction of the marking area was substantially impossible.

EXAMPLE 4

There were mixed 300 parts of ITO 150 parts of calcium carbonate, 500 parts of an acrylic resin solution (solid content=30%), 200 parts of methyl ethyl ketone and 400 parts of butyl acetate. The mixture was dispersed by the use of a ball mill to obtain marking ink (4).

The ink (4) was coated on a tinplate sheet (thickness=0.5 mm) to form a numeral of "123" by the use of a gravure coater. On at least the numeral was coated the same aqueous clear coating as used in Example 1, in a film thickness of 10 μm, followed by drying.

The numeral-printed tinplate sheet was irradiated with infrared rays of 5 μm wavelength, whereby the printed numeral could be identified clearly. Moreover, the adhesion between the ink (4) film and the tinplate sheet was good, and the visual distinction of the numeral area was impossible.

EXAMPLE 5

The ink (1) of Example 1 was coated on a PET film (thickness=12.5 μm) to form letters of "ALESCO" in a film thickness of 4 μm by the use of a gravure coater and then dried. On the letters-formed side of the PET film was coated an adhesive by the use of a gravure coater. The resulting material was subjected to solvent vaporization and then laminated with an aluminum plate (thickness=0.3 mm) at 800° C.

The resulting laminate was irradiated with infrared rays of 3 μm wavelength to identify the printed information (ALESCO). As a result, the information could be identified clearly. Moreover, the adhesion between the ink (1) film and the aluminum plate was good and the visual distinction of the letters-printed area was impossible.

EXAMPLE 6

An organic solvent type white ink was coated on an aluminum plate (thickness=0.8 mm) in a film thickness of 4 μm and dried at 140° C. Thereon was coated the marking ink (3) obtained in Example 3, to form a bar code pattern in a film thickness of 2 and then dried. The resulting aluminum plate was irradiated with infrared rays in the same manner as in Example 2. As a result, the printed bar code pattern could be identified clearly. Moreover, the adhesion between the coating films and the aluminum plate was good and the visual distinction of the printed bar code pattern was substantially impossible.

EXAMPLE 7

There were mixed 300 parts of ITO, 40 parts of an alumina powder [Aluminum Oxide C ( trade name) produced by Nippon Aerosil Co., Ltd.], 140 parts of a polyester resin (a solution having a solid content of 50%), 2 00 parts of butyl acetate and 150 parts of toluene. The mixture was dispersed by the use of a paint conditioner to obtain a marking ink (5).

The ink (5) was coated on a tinplate sheet (thickness =0.3 mm) to form a bar code pattern in a film thickness of 4 μm and dried at 80° C. Thereon was coated a white ink (a) [Ales Aqua Gloss White (trade name), an aqueous facing paint produced by Kansai Paint Co., Ltd.] in a film thickness of 5 μm by the use of a wire coater, followed by drying at 90° C.

The single layer consisting of the white ink (a) alone had an infrared (3 μm wavelength) reflectance of 50% while the double layer consisting of the marking ink (5) and the white ink (a) had an infrared (3 μm wavelength) reflectance of 5%. As a result, the two areas could be distinguished clearly. Moreover, the adhesion between the ink (5) film and the tinplate sheet was good, and the visual distinction of the bar code pattern through the white ink (a) was impossible.

EXAMPLE 8

There were mixed 300 parts of ITO, 40 parts of barium sulfate, 250 parts of an acrylic resin emulsion (solid content=40%) and 300 parts of tap water, and the mixture was dispersed by the use of a sand mill to obtain a marking ink (6).

The ink (6) was coated on an aluminum-metallized paper (thickness=0.3 mm) to form a numeral in a film thickness of 5 μm and dried at 100° C. for 8 seconds. Thereon was coated a gray ink (b) in a film thickness of 4 μm by the use of a gravure coater, followed by drying at 90° C. The gray ink (b) was obtained by mixing 500 parts of an acrylic resin emulsion (solid content=35%), 180 parts of titanium dioxide, 0.5 part of carbon black and 100 parts of water and dispersing the mixture by the use of a paint conditioner.

The single layer consisting of the white ink (b) alone had an infrared (3 μm wavelength) reflectance of 50% while the double layer consisting of the marking ink (6) and the white ink (b) had an infrared (3 μm wavelength) reflectance of 5%. As a result, the two areas could be distinguished clearly. Moreover, the adhesion between the ink (6) film and the aluminum-metallized paper was good, and the visual distinction of the numeral through the white ink (b) was impossible.

EXAMPLE 9

There were mixed 600 parts of ITO, 100 parts of silicon dioxide [MIZUKASIL P-526 ( trade name) produced by Mizusawa Chemical Co., Ltd.], 350 parts of a polysiloxane resin (solid content=40%), 200 parts of isopropyl alcohol and 300 parts of isobutyl acetate. The mixture was dispersed by the use of a sand mill to obtain a marking ink (7).

Separately, there were mixed 400 parts of a polysiloxane resin (solid content=40%), 120 parts of titanium dioxide and 40 parts of zinc oxide, and the mixture was dispersed to obtain a white ink (c).

The ink (7) was coated on an aluminum plate (thickness= 0.3 mm) to form a numeral in a film thickness of 5 μm and dried at 100° C. for 8 seconds. Thereon was coated the white ink (c) in a film thickness of 4 μm by the use of a roll coater, followed by drying at 90° C.

The single layer consisting of the white ink (c) alone had an infrared (3 μm wavelength) reflectance of 50% while the double layer consisting of the marking ink (7) and the white ink (c) had an infrared (3 μm wavelength) reflectance of 5%. As a result, the two areas could be distinguished clearly. Moreover, the adhesion between the ink (7) film and the aluminum plate was good, and the visual distinction of the numeral through the white ink (c) was impossible.

EXAMPLE 10

There were mixed 300 parts of ITO, 210 parts of calcium carbonate, 300 parts of a polyester resin (solid content= 50%), 200 parts of toluene and 200 parts of ethyl acetate. The mixture was dispersed by the use of a paint conditioner to obtain a marking ink (8).

The marking ink (8) was coated on a tin-free steel plate (thickness =0.5 mm) to form a bar code pattern in a film thickness of 5 μm and dried at 80° C.

There were mixed 100 parts of a polyester resin [Vylon (trade name) produced by Toyobo Co., Ltd.], 80 parts of titanium dioxide, 150 parts of toluene, 150 parts of methyl ethyl ketone and 130 parts of ethyl acetate. The mixture was dispersed by the use of a paint conditioner to obtain a white ink (d). The white ink (d) was coated on the bar code pattern-printed side of the tin-free steel plate in a film thickness of 6 μm by the use of a gravure coater and dried at 110° C.

The single layer consisting of the white ink (d) alone had an infrared (3 μm wavelength) reflectance of 55% while the double layer consisting of the marking ink (8) and the white ink (d) had an infrared (3 μm wavelength) reflectance of 5%. As a result, the two areas could be distinguished clearly. Moreover, the adhesion between the ink (8) film and the tin-free steel plate was good, and the visual distinction of the bar code pattern through the white ink (d) was impossible.

EXAMPLE 11

The white ink (d) was coated on a PET film (thickness= 12.5 μm) in a film thickness of 4 μm and dried. Thereon was coated the marking ink (6) to form bar code pattern in a film thickness of 3 μm by the use of a gravure roarer, followed by drying. On the coated side of the PET film was coated an adhesive of electron beam-setting type, and the resulting PET film was laminated with an aluminum plate. The laminate was irradiated with an electron beam of 4 Mrad for curing.

The laminate was irradiated with infrared rays of 3 μm wavelength. As a result, the bar code pattern could be identified clearly. Moreover, the adhesion between the ink film and the aluminum plate was good, and the visual distinction of the bar code pattern through the white ink (d) was impossible.

EXAMPLE 12

An organic solvent type white ink (e) was coated on a PET film (thickness=12.5 μm) in a film thickness of 4 μm and dried. Thereon was coated the marking ink (5) to form an English letters pattern in film thickness of 5 μm by the use of a gravure coater, followed by drying. Thereon was coated an organic solvent type polyester resin adhesive, after which the solvent was evaporated. The resulting material was laminated with a tinplate sheet at 160° C.

Incidentally, the above white ink (e) was obtained by mixing 100 parts of a polyester resin [Vylon (trade name) produced by Toyobo Co., Ltd.], 100 parts of zinc oxide, 160 parts of toluene, 150 parts of methyl ethyl ketone and 140 parts of ethyl acetate and dispersing the mixture by the use of a paint conditioner.

The above-obtained laminate was irradiated with infrared rays of 3 μm wavelength. As a result, the English letters pattern could be identified clearly. Moreover, the adhesion between the ink film and the tinplate sheet was good, and the visual distinction of the English letters pattern through the white ink (e) was impossible.

What is claimed is:

1. A method for formation of invisible marking, which comprises printing information on the surface of a substrate with a marking ink containing a mixture of an indium-tin mixed oxide and at least one compound selected from the group consisting of alumina, barium sulfate, silicon dioxide and calcium carbonate.

2. The method set forth in claim 1, wherein the indium-tin mixed oxide consists of 5–95% by weight of indium oxide and 95–5% by weight of tin oxide.

3. The method set forth in claim 1, wherein the indium-tin mixed oxide consists of 40–90% by weight of indium oxide and 60–10% by weight of tin oxide.

4. The method set forth in claim 1, wherein the marking ink contains the at least one compound selected from the group consisting of alumina, barium sulfate, silicon dioxide and calcium carbonate, in an amount of 10–400 parts by weight per 100 parts by weight of the indium-tin mixed oxide.

5. The method set forth in claim 1, wherein the marking ink contains the at least one compound selected from the group consisting of alumina, barium sulfate, silicon dioxide and calcium carbonate, in an amount of 30–300 parts by weight per 100 parts by weight of the indium-tin mixed oxide.

6. The method set forth in claim 1, wherein the indium-tin mixed oxide has an average particle diameter of 0.001–0.5 μm.

7. The method set forth in claim 1, wherein the marking ink further contains a coating resin as the vehicle.

8. The method set forth in claim 7, wherein the marking ink contains the mixture of an indium-tin mixed oxide and at least one compound selected from the group consisting of alumina, barium sulfate, silicon dioxide and calcium carbonate, in an amount of 50–1,000 parts by weight per 100 parts by weight (as solid content) of the coating resin.

9. The method set forth in claim 1, wherein the substrate surface reflects 20% or more of the infrared rays of 2–10 μm wavelength applied thereon.

10. The method set forth in claim 1, wherein the printing of information with the marking ink is conducted by gravure coating, silk screen printing, offset printing or ink jet printing.

11. The method set forth in claim 1, wherein the printing of the information with the marking ink is conducted in a dry film thickness of 0.5–10 μm.

12. The method set forth in claim 1, which further comprises coating a clear coating on at least the marking ink area of the substrate.

13. The method set forth in claim 12, wherein the clear coating is coated in a dry film thickness of 1–20 μm.

14. The method set forth in claim 1, which further comprises coating a coloring ink on at least the marking ink area of the substrate.

15. The method set forth in claim 14, wherein the coloring ink is coated in a dry film thickness of 0.5–20 μm.

16. A met hod for reading of invisible marking, which comprises applying infrared rays of 2–10 μm wavelength onto an invisible marking-printed material obtained by the method of any of claims 1–15, to measure the infrared absorptivities of the invisible marking area and other area of said material and identify the information signified by the invisible marking.

17. The method set forth in claim 16, wherein the measurement of the infrared absorptivities is conducted by the use of an infrared detector or an infrared camera.

18. A marking ink containing a mixture of an indium-tin mixed oxide and at least one compound selected from the group consisting of alumina, barium sulfate, silicon dioxide and calcium carbonate.

* * * * *